(12) United States Patent
Pinto et al.

(10) Patent No.: US 8,868,532 B2
(45) Date of Patent: Oct. 21, 2014

(54) MESSAGE EXCHANGE PATTERN RENDEZVOUS ABSTRACTION

(75) Inventors: Edmund Samuel Victor Pinto, Duvall, WA (US); Kenneth D. Wolf, Seattle, WA (US); Nicholas A. Allen, Redmond, WA (US); Stefan Batres, Sammamish, WA (US); Justin David Brown, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 431 days.

(21) Appl. No.: 12/189,020

(22) Filed: Aug. 8, 2008

(65) Prior Publication Data

US 2010/0036859 A1    Feb. 11, 2010

(51) Int. Cl.
*G06F 7/00* (2006.01)
*G06F 17/00* (2006.01)
*G06F 17/30* (2006.01)

(52) U.S. Cl.
CPC ............................... *G06F 17/30* (2013.01)
USPC ....................... 707/705; 707/769; 709/202

(58) Field of Classification Search
USPC ................... 707/705, 769; 709/202
See application file for complete search history.

(56) References Cited

U.S. PATENT DOCUMENTS

| | | | |
|---|---|---|---|
| 7,200,676 B2 | 4/2007 | Christensen | |
| 7,349,384 B2 | 3/2008 | Hill | |
| 7,412,486 B1 * | 8/2008 | Petrack et al. | 709/206 |
| 7,912,973 B2 * | 3/2011 | Feingold et al. | 709/230 |
| 2002/0161907 A1 | 10/2002 | Moon | |
| 2005/0267772 A1 | 12/2005 | Nielsen | |

OTHER PUBLICATIONS

Section 2.2.22 Message Exchange Pattern (MEP)—Mark Jones http://markmail.org/message/yptuqlr6xtidsngc (1 Page).
Message Exchange Pattern http://en.wikipedia.org/wiki/Message_Exchange_Pattern (1 Page).
SSDL—The SOAP Service Description Language http://www.ssdl.org/docs/v1.3/html/Rules%20SSDL%20Protocol%20Framework%20v1.3.html (10 Pages).
Automatic Enactment of Message Exchange Pattern for Web Services http://delivery.acm.org/10.1145/1250000/1244352/p1649-cheng.pdf?key1=1244352&key2=0341043021&coll=GUIDE&dl=GUIDE&CFID=15151515&CFTOKEN=6184618 (5 Pages).
Wmb-Util—Pain Relief for Websphere Message Broker http://wiki.callistaenterprise.se/pages/viewrecentblogposts.action?key=CallistaCom (20 Pages).

* cited by examiner

*Primary Examiner* — Usmaan Saeed
*Assistant Examiner* — Paul Kim
(74) *Attorney, Agent, or Firm* — Ben Tabor; Brian Haslam; Micky Minhas

(57) ABSTRACT

A rendezvous abstraction that is used to correlate messages within message exchange. The rendezvous abstraction may be instantiated to correlate messages regardless of the type of message exchange pattern, and regardless of the underlying protocols used to communication message. Messages exchanges of primitive protocols are modeled as unilateral message exchanges. The rendezvous abstraction is used to correlate messages of the unilateral message exchange, and serves as an abstraction that is used to represented the rendezvous point where the message of the message exchange pattern are handled. Accordingly, instead of focusing on the protocol-specific mechanisms for correlation, if even available, the application author may simply work with a standard rendezvous abstraction.

16 Claims, 7 Drawing Sheets

MESSAGE EXCHANGE PATTERN RENDEZVOUS ABSTRACTION

BACKGROUND

Modern day communication and applications are facilitated by message processors communicating messages back and forth. A variety of communication protocols have been developed, each capable of performing distinct message exchange patterns. For instance, in half-duplex protocols, a single request is followed by a single response. In full-duplex protocols, however, there can be any number of incoming messages and any number of outgoing messages all corresponding to the same message exchange.

In order for messages to be considered to be part of the same message exchange, there is usually some mechanism for correlating each message to the message exchange. In any given protocol, there may be one or more mechanisms for correlating such messages. Given that there are a wide variety of communication protocols available to engage in message exchange patterns, this means there is a large variety of correlation mechanisms available to correlate messages in the same message exchange pattern.

BRIEF SUMMARY

Embodiments described herein relate to a rendezvous abstraction that is used to correlate messages within different message exchanges. A rendezvous abstraction instance may be used for a variety of different message exchange patterns. In one embodiment, the rendezvous abstraction may be used independent of the underlying protocols used to actually communicate the messages of the exchange. Accordingly, instead of focusing on the protocol-specific mechanisms for correlation, if even available, the application author may simply work with a standard rendezvous abstraction that is similar for all message exchange patterns, and for all underlying communication protocols.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

In accordance with embodiments described herein, a rendezvous abstraction that is used to correlate messages within message exchange. The rendezvous abstraction may be instantiated to correlate messages regardless of the type of message exchange pattern, and regardless of the underlying protocols used to communicate the messages. First, some introductory discussion regarding message processors will be described with respect to FIGS. 1A and 1B. Then, various embodiments of a rendezvous abstraction will be described with respect to FIGS. 2 through 6.

Figure 1A:
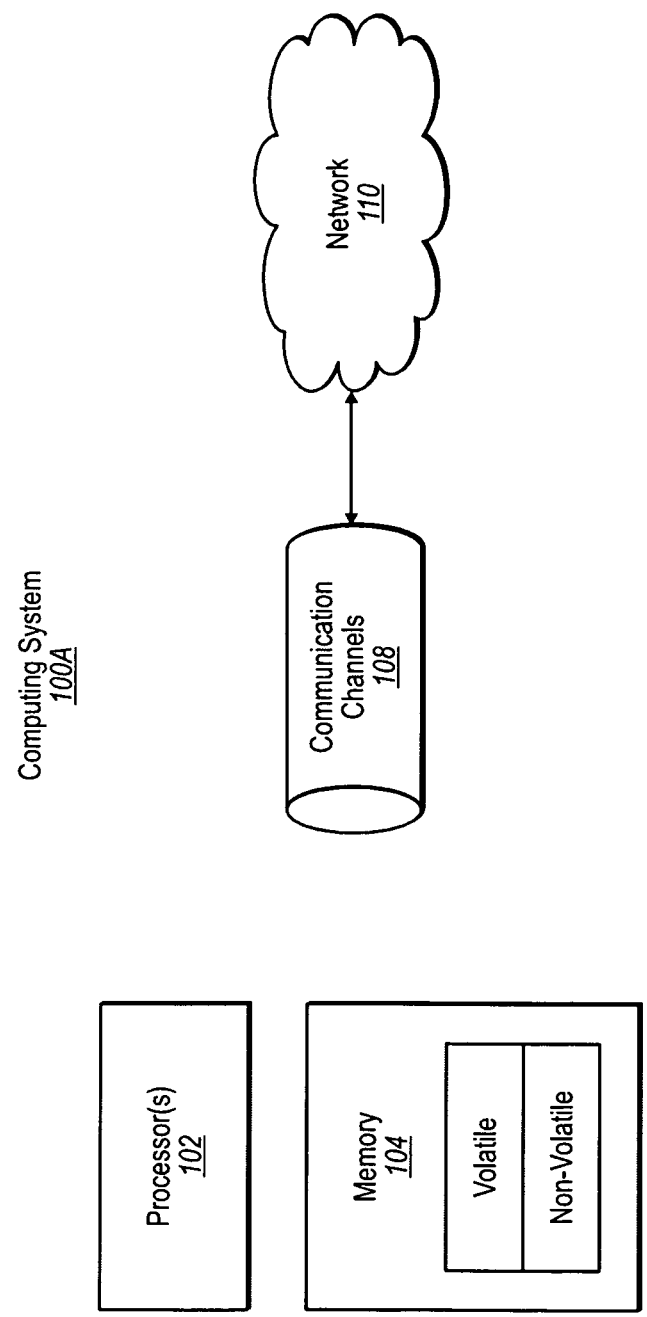
FIG. 1A illustrates one example of a message processor in the form of a computing system.

A message processor may be implemented in software or hardware, or a combination thereof. FIG. 1A illustrates a computing system, which may implement a message processor in software. Computing systems are now increasingly taking a wide variety of forms. Computing systems may, for example, be handheld devices, appliances, laptop computers, desktop computers, mainframes, distributed computing systems, or even devices that have not conventionally considered a computing system. In this description and in the claims, the term "computing system" is defined broadly as including any device or system (or combination thereof) that includes at least one processor, and a memory capable of having thereon computer-executable instructions that may be executed by the processor. The memory may take any form and may depend on the nature and form of the computing system. A computing system may be distributed over a network environment and may include multiple constituent computing systems. That said, a "message processor" is not even limited to use in a computing system at all.

FIG. 1A illustrates a message processor in the form of a computing system 100A. In its most basic configuration, a computing system 100A typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

As used herein, the term "module" or "component" can refer to software objects or routines that execute on the computing system. The different components, modules, engines, and services described herein may be implemented as objects or processes that execute on the computing system (e.g., as separate threads). However, as will be described further below with respect to FIG. 1B, the message processor may be implemented as a state machine as well, perhaps even fully in hardware.

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100A.

Computing system 100A may also contain communication channels 108 that allow the computing system 100A to communicate with other message processors over, for example, network 110. Communication channels 108 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Figure 1B:
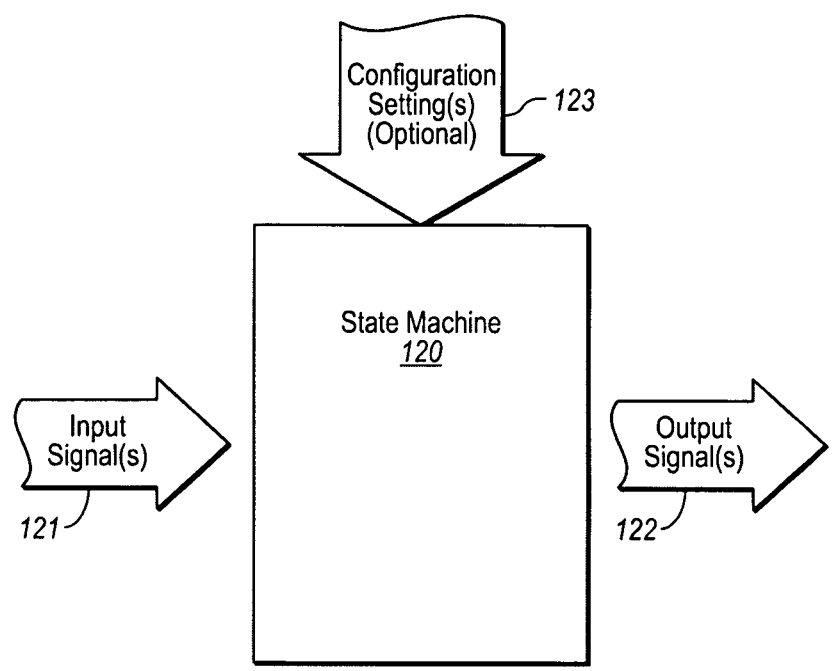
FIG. 1B illustrates another example of a message processor in the form of a state machine.

FIG. 1B illustrates a message processor in the form of a state machine 120. A state machine 120 may be implemented entirely in hardware, although that need not be the case. The state machine 120 receives input signal(s) 121, and deterministically generates output signal(s) 122. Optionally, the deterministic function may depend on one or more optional configuration settings 123. In one embodiment, the state machine 120 may be implemented using logic gates and potentially other circuit components such as perhaps registers and clocks. When implemented as a message processor, the state machine 120 may perform the message dispatch described herein.

Now that example message processors have been described, FIG. 2 will now be described, which illustrates a particular messaging processing environment 200. The various illustrated components may be implemented in software or hardware. For instance, if a given component is implemented in software, the computing system 100A of FIG. 1A may cause the component to be created and operated by the processor(s) 102 executing computer-executable instructions from the memory 104. If implemented in hardware, the component may be a computing system or device such as that illustrated with respect to FIG. 1B.

Figure 2:
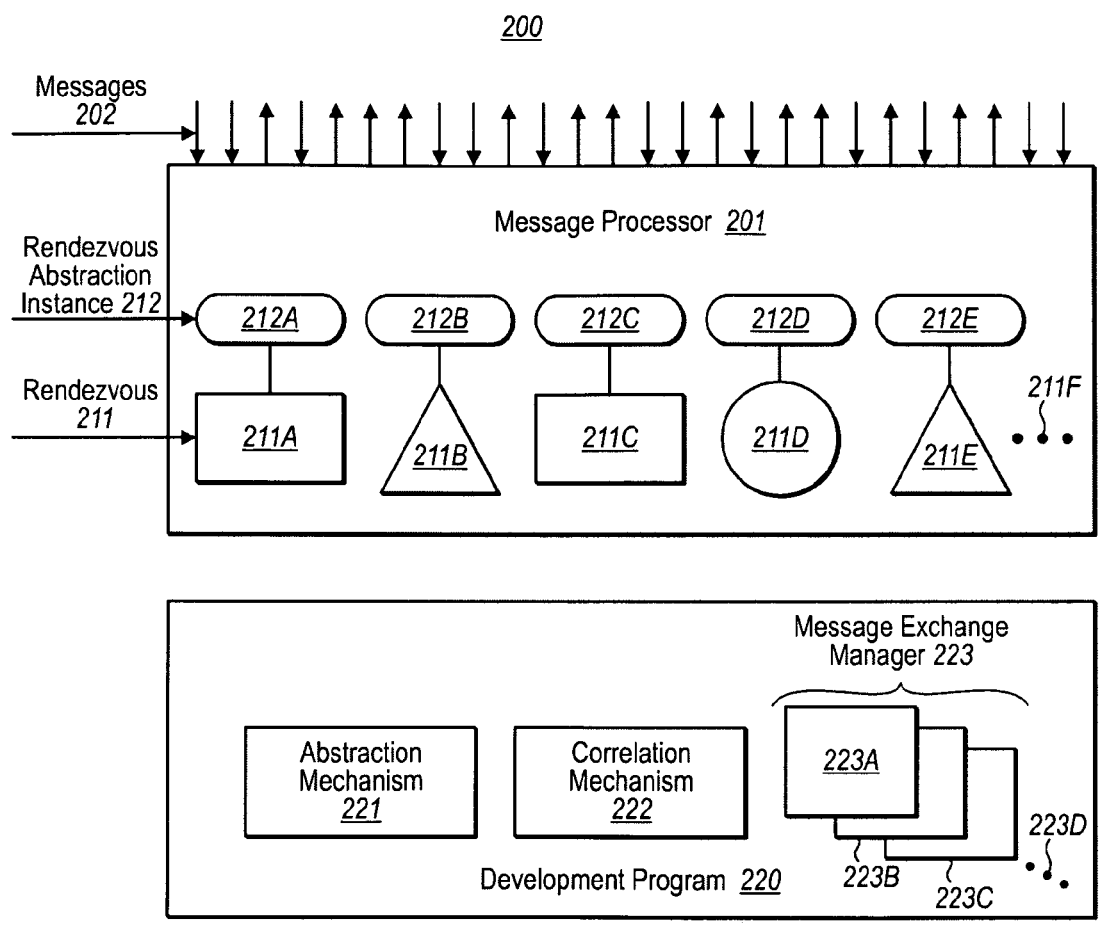
FIG. 2 illustrates a message processing environment in which a message processor receives and sends a variety of messages.

FIG. 2 illustrates a message processing environment 200 in which a message processor 201 receives and sends a variety of messages 202. Some of these messages may be part of the same message exchange. A message exchange includes multiple correlated messages. Message exchanges often follow a message exchange pattern. For example, in the Hypertext Transport Protocol (HTTP), the message exchange pattern includes two messages, a single request and a single response. The message exchange pattern might also specify timing relationships. For instance, in HTTP, the single request is followed by the single reply. In full-duplex protocols, there may be multiple outgoing message, and multiple incoming messages, which perhaps some timing relationships specified between some or all of those messages.

The message processor 201 may be as simple as a processor that engages in perhaps only a single message exchange at a time. Alternatively, the message processor 201 might be more complex and engage in multiple message exchanges at a time. Alternatively or in addition, the message processor 201 might be complex enough to engage in message exchanges of different message exchange pattern types, whether those message exchanges be sequential or concurrent message exchanges.

The set of correlated messages for each message exchange are processed using particular computing resource(s). Such computing resources may be referred to herein as a "rendezvous" since they logically represent a location where incoming messages (if any) of a message exchange are logically received and processed, and where outgoing messages (if any) of a message exchange are logically formulated and transmitted. The rendezvous for each message exchange includes a distinct set of computing resources that are used for that message exchange. For instance, a rendezvous could include processing resources, a process, a thread, memory address ranges, component instances, network bandwidth, message exchange state and so forth.

Referring to FIG. 2, the message processor 201 is illustrated in a state in which there are five total concurrent message exchanges that the message processor 201 is participating with, as evidenced by there being a total of five rendezvous locations 211 including rendezvous 211A, 211B, 211C, 211D and 211E. However, as symbolized by the ellipses 211F, there may be other numbers of concurrent message exchanges occurring, perhaps only one or even zero message exchanges at a given time. In addition, as new message exchanges are added and deleted, the number of message exchanges may be increased or decreased, respectively.

While the rendezvous locations might all corresponding to message exchanges of the same message exchange pattern, that need not be the case. In fact, the rendezvous 211A and 211C are illustrated as rectangular to represent that while they serve different message exchanges, those message exchanges are part of the same message exchange pattern. For instance, perhaps the rendezvous 211A serves a message exchange that is simply request-reply, whereas the rendezvous 211C serves a different message exchange that also happens to be request-reply. The rendezvous 211B and 211E are illustrated as being triangles to represent that they serve message exchanges that are different message exchange patterns than the rendezvous 211A and 211C. For instance, the rendezvous 211B might serve a message exchange that is a solicit-response message exchange pattern, while the rendezvous 211A serves another message exchange that also happens to be a solicit-response message exchange pattern. The rendezvous 211D is shown as being circular symbolizing a third concurrent message exchange pattern is being served. For instance, perhaps the message exchange served by the rendezvous 211D is of a full-duplex message exchange pattern.

An instance of a rendezvous abstraction serves to abstract each of the rendezvous 211A through 211E. For instance, rendezvous abstraction instances 212A through 212E serve to abstract respective rendezvous 211A through 211E, respectively. The instances 212A through 212E (also referred to collectively hereinafter as "rendezvous abstraction instances 212") are all illustrated as being oval-shaped. This symbolizes that even through the underlying rendezvous serve message exchanges of various message exchange patterns, the rendezvous abstraction instances themselves may be instances of even the same class.

The rendezvous abstraction instances may each have correlation logic that correlates messages in a message exchange regardless of the underlying protocols or correlation mechanisms used to correlate messages in a message exchange. The correlation logic may even allow the use of multiple communication protocols. For instance, a message may be received in a message exchange pattern using HTTP, and a corresponding outgoing message may be transmitted using another protocol (e.g., User Datagram Protocol (UDP). Accordingly, computing resources external to the rendezvous may interface with the rendezvous through a common abstraction, rather than having to customize functionality for each type of message exchange pattern, and without having to address correlation differently for each underlying protocol and/or correlation mechanism.

Although perhaps not present after deployment of the message processor 201, the environment 200 is also illustrated as containing a development program 220 that is likely more often present during development time. The development program includes a message exchange rendezvous abstraction mechanism 221, a correlation mechanism 222, and pre-packaged exchange managers 223.

The message exchange rendezvous abstraction mechanism 221 permits developers to generate code that causes instances of rendezvous abstractions to be formulated at runtime. For instance, the developer could use the mechanism 221 to generate computer-executable instructions that, when executed, causes the message processor 201 to instantiate the various rendezvous abstractions 212, one for each message exchange. The term "generate code" is intended herein to be interpreted broadly. For instance, "code" may be source code, binary machine code, or any form of intermediate code. Code may be "generated" by a developer expressly writing the code. Alternatively or addition, the mechanism 221 may include a development tool that allows the developer to indirectly generate all or one or more portions of code. For instance, the mechanism could include a graphical editor that allows the developer to manipulate visual objects that represent components of the code.

The correlation mechanism 222 permits the developer to expressly or implicitly specify how correlate transmitted and/ or received messages of the message exchange are to be correlated to the rendezvous abstraction instance. One mechanism to do this would be through what will be referred to hereinafter as a "correlation handle". However, the principles described herein are not limited to the use of such a correlation handle.

The pre-packaged exchange managers 223 each include a manager that manages message exchanges of corresponding message exchange patterns. In one embodiment, the managers 223 may be provided for more common message exchange patterns. For instance, there might be one manager 223 for a request-reply message exchange pattern, one for solicit response message exchange patterns, and the like. Given the wide-variety of possible message exchange patterns, there might not be a manager for every message exchange pattern. The illustrated managers 223 are illustrated as including three pre-packaged message exchange managers 223A through 223C. However, there may be more or less than this number as symbolized by the ellipses 223D.

In a continuation-based runtime, as an example, the manager might be implemented as a single activity. In that case, as an example, a request-reply manager might be implemented as a "Request-Reply" activity which includes a "Sequence" activity that then includes a transmit activity and a receive activity, for transmitting and receiving a message. The request-reply activity might also include some expressed or implicit indication that the transmit and receive messages are correlated to the same rendezvous abstraction instance. Examples will be given further below.

Figure 3:
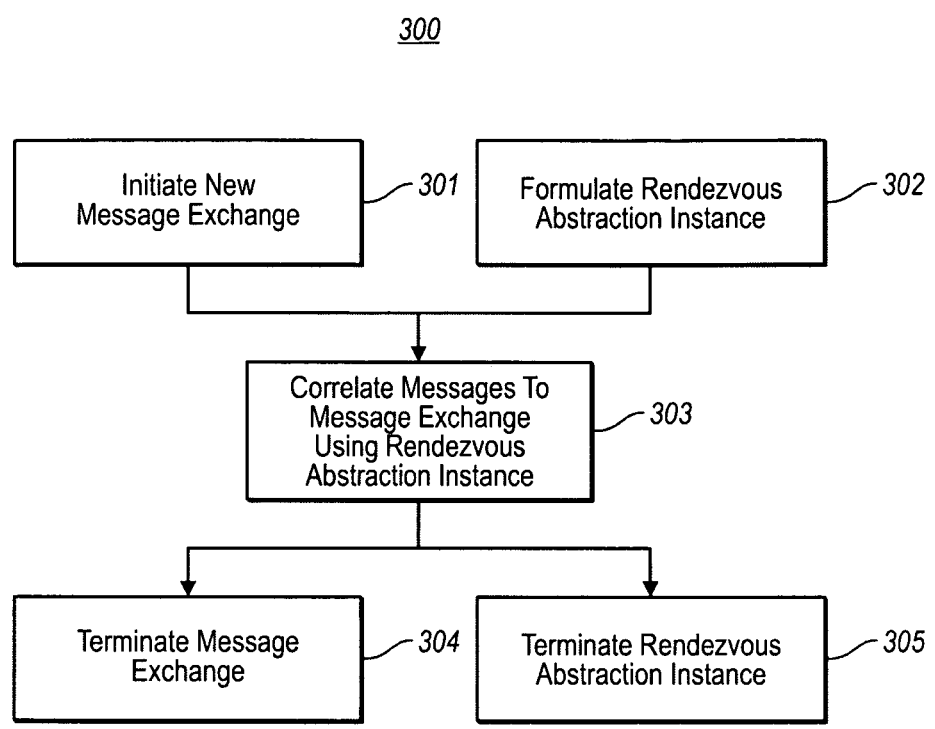
FIG. 3 illustrates a flowchart of a method for correlating messages in a message exchange.

FIG. 3 illustrates a flowchart of a method 300 for correlating messages in a message exchange. The method 300 may be performed for each message exchange. For instance, in the case of FIG. 2, the method 300 may be performed for each of the five message exchanges corresponding to the rendezvous 211A through 211E, and each time a subsequent rendezvous is established for a new message exchange.

In accordance with the method 300, a new message exchange is initiated (act 301). This might occur, for example, when a message is encountered (i.e., received for an incoming message or formulated for an outgoing message) that does not already correspond to an existing message exchange. In addition, an instance of a rendezvous abstraction may be formulated to correspond to the new message exchange (act 302). Since there is no timing dependency on when the message exchange is initiated as compared to when the corresponding rendezvous abstraction instance is formulated, the acts 301 and 302 are shown in parallel in FIG. 3. The rendezvous abstraction instance may be formulated before, during, and/or after the initiation of the message exchange. During the lifetime of the message exchange, the rendezvous abstraction instance may be used to correlate some or even all of the message in that message exchange (act 303). For instance, to perform this correlation, the rendezvous abstraction instance may be associated with some application state. Each message of the message exchange may then be correlated through the rendezvous abstraction instance. The correlated message(s) may then each be further processed using the application state associated with the rendezvous abstraction instance. At some point, the message exchange ends (act 304), at which time the corresponding rendezvous abstraction may also be terminated (act 305). In some embodiments, the rendezvous abstraction instance may be preserved for some time after the message exchange ends so that duplicate or spurious messages in the message exchange can be recognized as belonging to the completed message exchange rather than a new message exchange.

Figure 4:
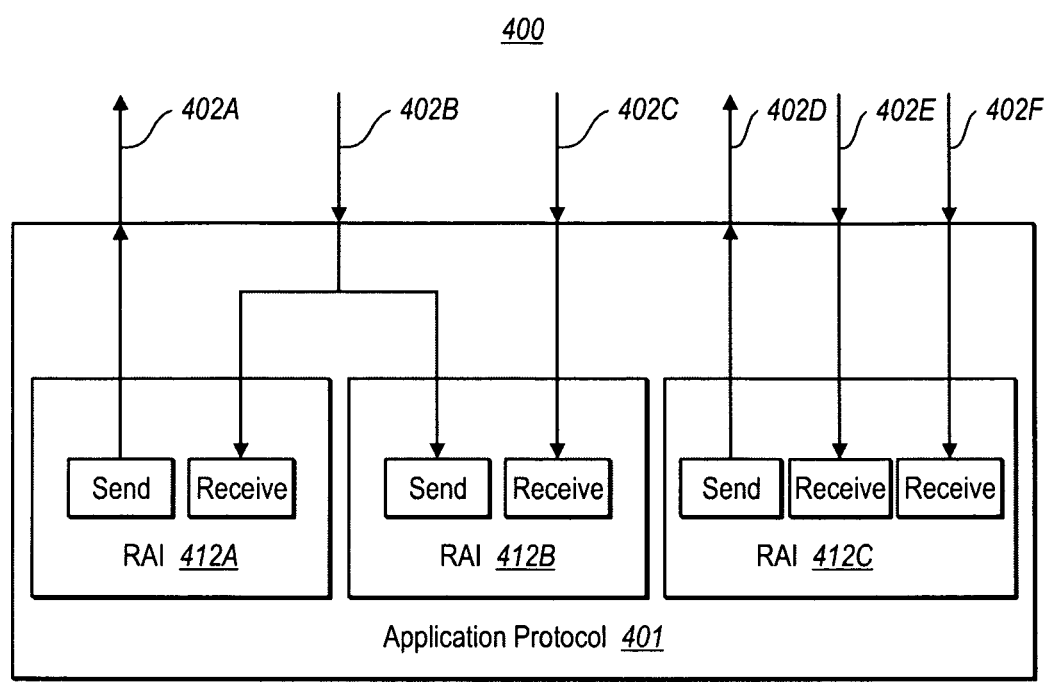
FIG. 4 illustrates another example message processing environment in which the method of FIG. 3 may be practiced.

FIG. 4 illustrates another example message processing environment 400 in which the method 300 may be practiced. In this embodiment, the message processor is an application protocol 401, and the method 300 is being performed for each of three rendezvous abstraction instances 412A through 412C. The term "rendezvous abstraction instance" is abbreviated as "RAI" in FIG. 4.

Over the course of executing the application protocol 401, the application exchanges messages with other systems. Each message exchange consists of one or more individual messages sent from one system to another. A decomposition of the application protocol is obtained by replacing each message exchange in the original protocol with one or more unidirectional message exchanges. Accordingly, FIG. 4 illustrates, as an example, messages 402A through 402F being received and transmitted by the application protocol 401.

In this description and in the claims, a message is "received" when it is accessible by the message processor. The term "received" is not meant to imply that the message was actually dispatched over a network, although that certainly can be the case. The message may simply be received from a lower level in the protocol stack. Likewise, in this description and in the claims, a message is "transmitted" when it is dispatched by the message processor to another component, such as a lower-level component in the protocol stack. The term "transmitted" does not mean that the message is ever actually transmitted over a network, although that also certainly may be the case.

Some of the unidirectional message exchanges will be related to others in a common message exchange. The permissible transitions of the application protocol define these relationships. In the case of FIG. 4, each of the rendezvous abstraction instances 412A, 412B and 412C are shown after acts 301 and 302 have been performed. In other words, the abstraction instances 412A, 412B and 412C are already formulated and correspond to existing message exchanges. The rendezvous abstraction instances are actively in act 303 of FIG. 3 in which the instances are being used to correlate message of the message exchange.

Figure 5:
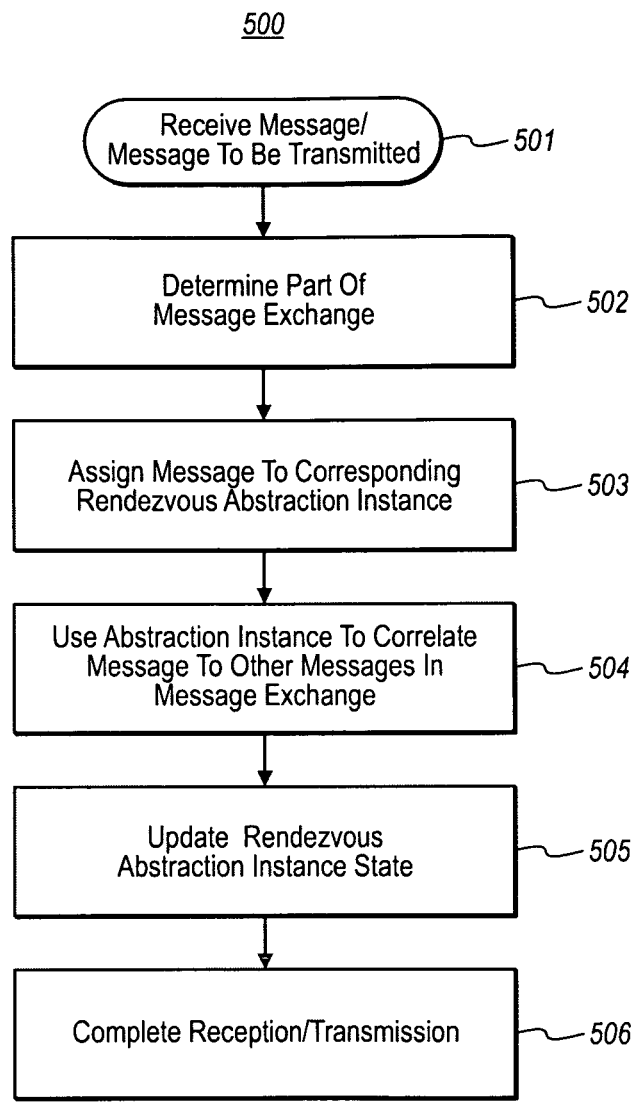
FIG. 5 illustrates a flowchart of a method for performing correlation in response to a received message or a determination that a message is to be transmitted.

In the specific example of FIG. 4, there are four received message 402B, 402C, 402E and 402F, and two transmitted messages 402A and 402D. The act of correlating messages (act 303) in the message exchange may involve some processing by the message processor each time a message is received or is to be transmitted. FIG. 5 illustrates a flowchart of a method 500 for performing correlation in response to a received message or a determination that a message is to be transmitted. The method 500 will be described with respect to each of the messages 402A through 402F being processed in FIG. 4.

The method 500 is initiated each time a message is received or each time it is determined that a message is to be transmitted (act 501). For instance, suppose that the message 402A is to be transmitted. It is then determined that the message to be transmitted is part of a message exchange (act 502). In particular, the message 402A exchange is an initial message of a two-message message exchange that will include messages 402A and 402B. In one embodiment, characteristics of the message itself may be used to determine what message exchange that message is to be part of. For instance, suppose that the message 402A is a purchase order for a particular book. The purchase order number might be used to uniquely identify the message exchange.

The message is then assigned to a rendezvous abstraction instance that corresponds to the message exchange (act 503). For instance, the rendezvous abstraction instance 412A may have been previously created to serve the message exchange corresponding to the purchase order. When the rendezvous abstraction instance 412A was created, it may have already been known that the messages that correlate to the instance will have a particular purchase order number. The rendezvous abstraction instance may thus be formulated as an instance of the rendezvous abstraction class. However, to distinguish this instance from other rendezvous abstraction instances, the rendezvous abstraction instance may have been created with a unique identifier. That unique identifier may be constructed from any reasonably unique characteristic of the message exchange (such as the purchase order number), or may be agreed to in advance by the communicating parties to the message exchange.

The rendezvous abstraction instance is then used to correlate the message to the other messages in the message exchange (act 504). Examples of how this may be done will be described below. However, generally speaking, the abstraction instance may maintain state needed to correlate messages in the message exchange. The abstraction instance may also be used as an expressed or implicit attribute of a message thereby establishing correlations with other messages that share that attribute value.

The rendezvous abstraction instance may then have its state updated to reflect the reception of or transmission of the message (act 505). For instance, the state of the rendezvous abstraction instance 412A may be updated to reflect the transmission of the message 402A. Before, concurrently with, or after this act, the reception or transmission (as appropriate) of the message is completed (act 506). For instance, in the case of message 402A, the message 402A is actually transmitted.

The method 500 is again initiated when the message 402B is received. Portions of the message 402B may be used for one message exchange, and portions may be used for another message exchange. For instance, suppose that the rendezvous abstraction instance corresponds to the message exchange associated with the purchase of the book between the customer and the book supplier. The rendezvous abstraction instance 412B may be associated with another message exchange associated with the shipment of the book. The message 402B might include order confirmation as well as shipping information. The order confirmation portion of the message may be used by the rendezvous abstraction instance 412A, whereas the shipping information may be used by the rendezvous abstraction instance 412B.

In the case of the order confirmation information, the purchase order identifier may once again be used to uniquely identify the rendezvous abstraction instance 412A. On the other hand, the shipping confirmation number may be used to create and/or identify the rendezvous abstraction instances as correlated with that portion of the message. The state of the corresponding rendezvous abstraction instances 412A and 412B are then updated.

When the message 402C is received, the method 500 is again performed. The message processor 401 identifies the rendezvous abstraction instance corresponding to the message 402C and the message 402C is assigned to the rendezvous abstraction instance. If the message exchange is completed for either or both of the message exchanges, the corresponding rendezvous abstraction instances may be terminated.

The sent message 402D and the received messages 402E and 402F are correlated with each other and to a common message exchange using yet another rendezvous abstraction instance 412C. In this case, the message exchange might be a full duplex message exchange for which there may be one or more outgoing messages, and one or more incoming messages. For instance, the message exchange corresponding to the rendezvous abstraction instance might be a daily pollen notification. The message 402D might represent an initial request, and include the region of interest, and the responses 402E and 402F might include daily pollen notifications.

In one specific example, the rendezvous abstraction instance is referred to as a "correlation handle". Whether with the use of correlation handles, or other types of rendezvous abstraction instances, such instances can be related implicitly or explicitly to message exchanges through the structure of the application. Examples of ways that the instance can be related to message exchanges include scoping, name based arrangements, positional grouping, or stylistic correspondence.

Over time there may be more than one instantiation of a particular related set of unidirectional message exchanges (and its corresponding correlation handle). To distinguish these instantiations, each instantiation is associated with a unique value. The instantiation value is derived from the exchanged messages or provided out of band. This value will be derivable from each message, including body, headers, and local message delivery properties, participating in the instantiation. Messages and message exchanges can be related to multiple correlation handles. Each handle is populated with a distinct instantiation value.

It is convenient to think of the value that varies from instantiation to instantiation as a slot in the correlation handle. The slot is filled once when the instantiation is created, with the instantiation's unique value. Other events can be recognized as belonging to the instantiation by virtue of having the same value. By recognizing message exchanges as belonging to the same instantiation, state can be shared among the exchanges.

Consider a simple application protocol implemented by a distributed application that receives a request and sends a response using a Request Reply primitive protocol. In one embodiment, this primitive protocol is further decomposed into unidirectional message exchanges. The request is expressed on the server as the unidirectional reception of a message and the reply is expressed as the unidirectional transmission of a message. The client may have an inverse expression in which the request is expressed as the unidirectional transmission of a message, and the reply is expressed as the unidirectional reception of a message. The relationship between reception and transmission is expressed as a correlation handle to which reception and transmission are bound.

One embodiment might use activities to model reception and transmission in a continuation based runtime. The correlation handle could be modeled as a variable which could be bound to the activities' parameters. The following XAML code example is one expression of this embodiment.

```
1. <Sequence>
2.   <Sequence.Variables>
3.     <CorrelationHandle x:Name="cor1"/>
4.   </Sequence.Variables>
5.   <ReceiveMessage CorrelatesWith="[cor1]"/>
6.   <SendMessage CorrelatesWith="[cor1]"/>
7. </Sequence>
```

The Sequence activity extends from lines 1 through 7, and contains two activities: ReceiveMessage (at line 5) and SendMessage (at line 6). The ReceiveMessage activity performs the unidirectional reception of the request. The SendMessage activity performs the unidirectional transmission of the reply. The Sequence activity contains the declaration of a CorrelationHandle named "cor1" as one of its variables (see lines 2 through 4). Both the ReceiveMessage and SendMessage have parameters named CorrelatesWith which are bound to this CorrelationHandle. This CorrelationHandle maintains the state required to facilitate the rendezvous between the reception of the request and transmission of the reply as expressed by the ReceiveMessage and SendMessage activities.

When this program executes, the ReceiveMessage registers a continuation that will be resumed when a message arrives. When the request message arrives, the associated context information necessary in order for a reply to be matched with the rendezvous instance is stored into the slot of CorrelationHandle "cor1". Later, when SendMessage executes, the value stored in "cor1" is used in order to regain access to the application state for the response message to be sent as a completion of the request-reply primitive protocol.

This sequence would equally support the case where a message arrives over a Duplex Session primitive protocol, and the SendMessage will be transmitted along that duplex primitive (e.g. TCP).

In addition, while this example has been simplified for illustrative purposes, this correlation mechanism can be used in disparate control flow mechanisms such as a flowchart or state machine. Further, related unidirectional message exchanges may be separated by an arbitrary amount of work, which may, or may not, cause changes to the state of the application and/or the correlation handle.

In this embodiment the lifetime of the correlation handle is governed by data scoping rules. As per these scoping rules the CorrelationHandle is available to the descendant activities of the containing activity. That said, the correlation information corresponding to the CorrelationHandle will not exist until initialized by the first messaging activity (this is the unique value that goes in to the correlation handle's slot). In a different embodiment, the CorrelationHandle may have been initialized by a non-messaging activity, such as if the correlation information was known ahead of time or transmitted apart from the message exchange being correlated, using an InitializeCorrelation activity with parameters bound to the correlation information and target CorrelationHandle. After this initialization, the CorrelationHandle is not modified (although its underlying state may well be modified) and all other associated messaging activities will use the CorrelationHandle as participants in the application protocol. In addition, it is possible to terminate a CorrelationHandle prior to the default data scoping rules. In one embodiment this could be accomplished using a TerminateCorrelation activity with a parameter bound to the target CorrelationHandle.

The unidirectional message exchanges can be packaged into precomposed patterns. In the XAML example above, a continuation-based activity is dedicated to each unidirectional message reception or transmission. However, referring to FIG. 2, activities may be provided for one or more of the message exchange managers 223. For instance, some patterns such as Request Reply and Solicit Response reflect common primitive protocols.

Figure 6:
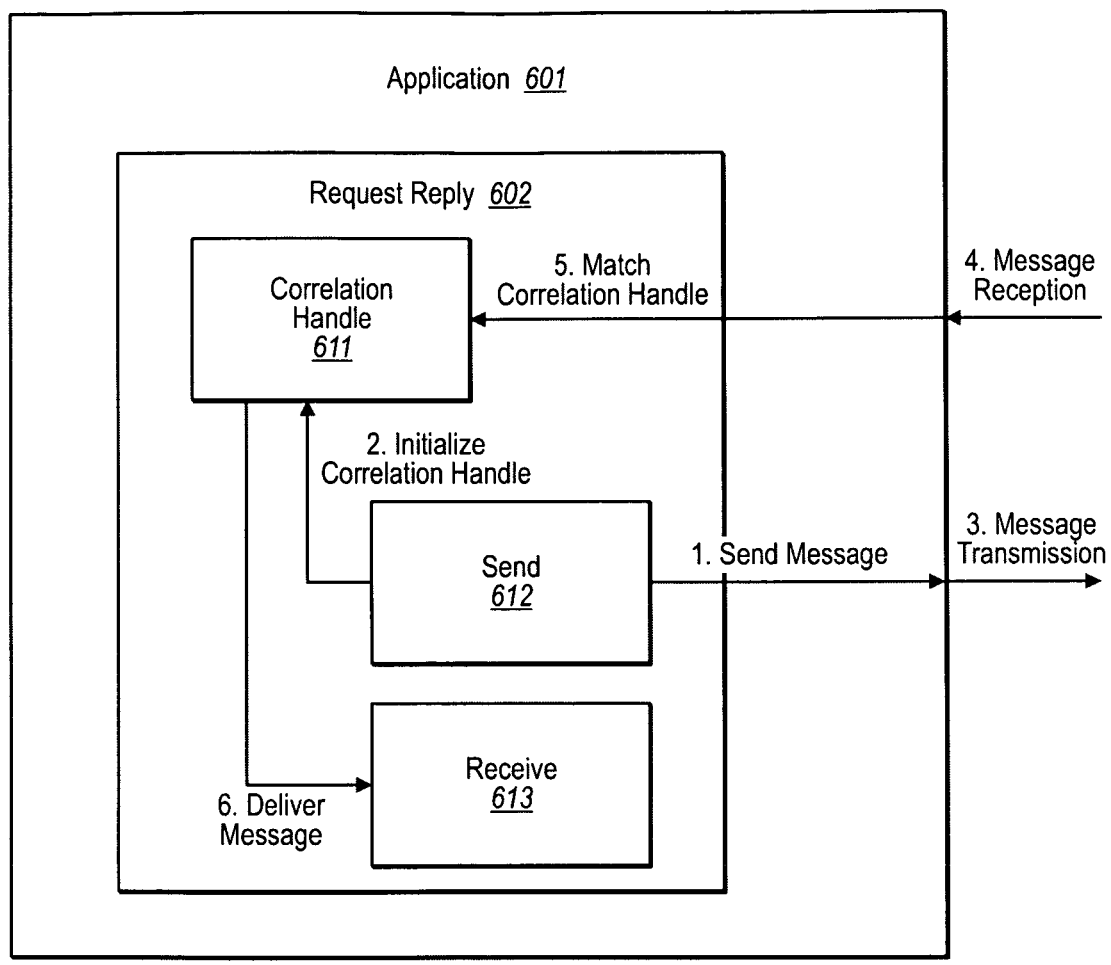
FIG. 6 illustrates one possible data structure and that might occur if a Request-Reply activity is encountered for execution.

FIG. 6 illustrate an example of a Request-Reply activity. In one embodiment, Request Reply could be packaged as a higher level activity containing the sequence described in the XAML snippet above (except in this case, the ordering of the SendMessage and ReceiveMessage activities are reversed). For instance, a Request-Reply activity could be structured as below in one specific example:

```
1. <Request-Reply>
2.   <Sequence>
3.     <Sequence.Variables>
4.       <CorrelationHandle x:Name="cor1"/>
5.     </Sequence.Variables>
6.     <SendMessage CorrelatesWith="[cor1]"/>
7.     <ReceiveMessage CorrelatesWith="[cor1]"/>
8.   </Sequence>
9. </Request-Reply>
```

FIG. 6 illustrates one possible data structure and flow 600 that might occur if the above-provided Request-Reply activity is encountered for execution. Upon encountering the Request-Reply activity represented above, the application 601 formulates the Request-Reply activity 602. Upon encountering line 2, the request-reply reply activity is configured to execute a sequence of child activities. In executing lines 3-5, a correlation handle having name "cor1" is declared, thereby causing the correlation handle 611 (which is an example of the rendezvous abstraction instance") to be generated.

The execution of line 6 causes the send activity 612 to formulate and execute to thereby send a message as represented by arrow 1. Also, because line 6 specifies that this message corresponds to the cor1 correlation handle, the correlation handle is caused to initialize if not already initialized, and the state of the correlation handle is updated to reflect the sending of the message. This is represented by the arrow 2. The message is also transmitted as represented by arrow 3.

Execution then proceeds to line 7, the ReceiveMessage activity. At this time, the Request-Reply activity registers a continuation. For the duration of the continuation, the application may receive any number of messages. One of those received messages may correlate to the correlation handle 611. For instance, the message is received as represented by arrow 4, and correlated to the correlation handle as represented by arrow 5. When this has occurred, the ReceiveMessage activity of line 7 can resume, which requires the receipt of a message corresponding to the same correlation handle as the message that was send in line 6. Accordingly, the received message is processed as represented by arrow 6.

Alternatively, some patterns may be composed to facilitate lifetime management and scoping. For instance, consider the following XAML example.

```
1. <Request-Reply>
2.   <CorrelationScope>
3.     <Sequence>
4.       <SendMessage />
5.       <ReceiveMessage />
6.     </Sequence>
7.   </CorrelationScope>
8. </Request-Reply>
```

The CorrelationScope activity in the above XAML example introduces an implicit CorrelationHandle to which all contained messaging activities are bound. The lifetime of the CorrelationHandle is equivalent to the lifetime of the CorrelationScope as per the data scoping rules mentioned above. Accordingly, upon encountering line 2 above, a correlation handle is implicitly declared. The SendMessage Activity and the ReceiveMessage activity are automatically assigned to the correlation handle since they are contained within the CorrelationScope activity. Upon encountering the close token </CorrelationScope> of line 7, the correlation handle is terminated.

Accordingly, the author may define mechanisms for correlating message exchanges using rendezvous abstraction instances, rather than having to delve into the details of the various correlation mechanisms that are available to the underlying primitive protocols. Thus, correlation may be made in a manner that is agnostic to the underlying protocol.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising one or more physical computer storage devices having thereon one or more computer-executable instructions that, when executed by one or more processors of a computing system, cause the computing system to perform a method for correlating a plurality of messages in a message exchange such that the correlation is independent of protocols underlying the message exchange, the method comprising:

an act of instantiating an instance of a rendezvous abstraction, the rendezvous abstraction being a logical representation of a set of computing resources used to process a set of correlated messages in a message exchange, the instance of a rendezvous abstraction being an instantiation of a rendezvous abstraction class which, without modification, provides a common interface for each of a plurality of distinct message exchange patterns and each of a plurality of distinct underlying communication protocols, wherein the common interface of the rendezvous abstraction is used by applications for communication in place of each of the underlying protocols and is used independent of the underlying protocols which are actually used to communicate the messages of the message exchange such that computing resources external to the rendezvous abstraction interface with the rendezvous abstraction through the common interface of the rendezvous abstraction without having to customize functionality for each distinct message exchange pattern, and without having to address correlation differently for each distinct underlying protocol and correlation mechanism;

an act of associating the rendezvous abstraction instance with at least a portion of an application state;

an act of correlating a message of a plurality of messages of a message exchange through the rendezvous abstraction instance such that the correlation uses the common interface and is independent of protocols underlying the message exchange; and an act of performing further processing on the correlated message using the associated application state.

2. A computer program product in accordance with claim 1, wherein the one or more computer-readable media is/are physical storage and/or memory media.

3. A computer program product in accordance with claim 2, wherein the message is a received message, and the act of correlating the message comprises:

an act of determining that the received message is part of the message exchange; and an act of assigning the received message to the rendezvous abstraction instance.

4. A computer program product in accordance with claim 3, the method further comprising:

an act of updating state of the rendezvous abstraction instance in response to the received message being received.

5. A computer program product in accordance with claim 3, wherein the act of determining that the received message is part of the message exchange is performed using one or more characteristics of the received message.

6. A computer program product in accordance with claim 3, wherein the act of correlating at least some of the plurality of message comprises:

an act of determining that a message to be transmitted is part of the message exchange;

an act of assigning the message to be transmitted to the rendezvous abstraction.

7. A computer program product in accordance with claim 6, further comprising an act of using state of the rendezvous abstraction instance to correlate the received message to the message to be transmitted in the message exchange.

8. A computer program product in accordance with claim 2, wherein the act of corresponding at least some of the plurality of message comprises:
   an act of determining that a message to be transmitted is part of the message exchange;
   an act of assigning the message to be transmitted to the rendezvous abstraction instance.

9. A computer program product in accordance with claim 8, the method further comprising:
   an act of updating state of the rendezvous abstraction instance in response to the message to be transmitted.

10. A computer program product in accordance with claim 2, wherein the computer-executable instructions are further configured to perform the method repeatedly for a plurality of message exchanges, each message exchange using a distinct rendezvous abstraction instance.

11. A computer program product in accordance with claim 2, the method further comprising:
   an act of receiving correlation information apart from the plurality of messages in the message exchange being correlated; and
   an act of updating state of the rendezvous abstraction instance with the received correlation information.

12. A computer program product in accordance with claim 2, wherein the one or more computer-readable media are a portion of a continuation based runtime, the act of correlating one of a plurality of messages of a message exchange through the rendezvous abstraction instance comprises:
   an act of correlating the message through the rendezvous abstraction using a corresponding continuation based activity.

13. A computer program product in accordance with claim 12, the method further comprising:
   an act of correlating another of the plurality of messages of the message exchange using the same corresponding continuation based activity.

14. A computer program product in accordance with claim 13, wherein the continuation based activity includes a plurality of descendent continuation based activities.

15. A method for developing an application that uses a plurality of messages in a message exchange pattern such that correlation of the messages is independent of protocols underlying the message exchange pattern, the method performed within a computing environment by executing computer-executable instructions upon one or more computer processors, the method comprising:
   an act of declaring an instance of a rendezvous abstraction class corresponding to the message exchange pattern, wherein the message exchange pattern is one of a plurality of distinct message exchange patterns, wherein the rendezvous abstraction class provides, without modification, a common interface for each of the plurality of distinct message exchange patterns and each of a plurality of distinct underlying communication protocols, and wherein the common interface of the rendezvous abstraction is used by applications for communication in place of each of the underlying protocols and is used independent of the underlying protocols which are actually used to communicate the messages of the message exchange such that computing resources external to the rendezvous abstraction may interface with the rendezvous abstraction through the common interface of the rendezvous abstraction, without having to customize functionality for each distinct message exchange pattern, and without having to address correlation differently for each distinct underlying protocol and/or correlation mechanism;

an act of generating code that performs a messaging activity on a message of the message exchange; and an act of associating the code that performs a messaging activity on a message of the message exchange to the instance of the rendezvous abstraction class such that the messaging activity can be performed through the common interface of the instance of the rendezvous abstraction in a manner which is independent of the plurality of distinct communication protocols underlying the message exchange without having to customize functionality for each distinct message exchange pattern.

16. A method in accordance with claim 15, wherein the act of declaring declares the instance implicitly.

* * * * *